US011474960B2

(12) United States Patent
Das Sharma

(10) Patent No.: US 11,474,960 B2
(45) Date of Patent: Oct. 18, 2022

(54) TECHNOLOGIES FOR PARTIAL LINK WIDTH STATES FOR MULTILANE LINKS

(71) Applicant: Intel Corporation, Santa Clara, CA (US)

(72) Inventor: Debendra Das Sharma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/076,739

(22) Filed: Oct. 21, 2020

(65) Prior Publication Data

US 2021/0042248 A1 Feb. 11, 2021

Related U.S. Application Data

(63) Continuation of application No. 16/293,269, filed on Mar. 5, 2019, now Pat. No. 10,846,247.

(51) Int. Cl.
| | |
|---|---|
| *G06F 13/16* | (2006.01) |
| *G06F 13/42* | (2006.01) |
| *G06F 12/0811* | (2016.01) |
| *G06F 13/40* | (2006.01) |

(52) U.S. Cl.
CPC ...... *G06F 13/1678* (2013.01); *G06F 12/0811* (2013.01); *G06F 13/4063* (2013.01); *G06F 13/4282* (2013.01); *G06F 2213/0026* (2013.01)

(58) Field of Classification Search
CPC ............ G06F 13/1678; G06F 13/4282; G06F 13/4063; G06F 13/20; G06F 13/4018; G06F 13/0811
See application file for complete search history.

(56) References Cited

U.S. PATENT DOCUMENTS

| | | |
|---|---|---|
| 6,970,013 B1 | 11/2005 | Cory |
| 7,136,953 B1 | 11/2006 | Bisson et al. |
| 7,468,754 B2 | 12/2008 | Carlsgaard et al. |
| 7,469,311 B1 | 12/2008 | Tsu et al. |
| 7,793,030 B2 | 9/2010 | Jenkins et al. |
| 7,809,969 B2 | 10/2010 | Sharma et al. |
| 8,627,156 B1 | 1/2014 | Erickson |
| 9,183,171 B2 | 11/2015 | Iyer et al. |
| 9,229,897 B2 | 1/2016 | Iyer et al. |

(Continued)

OTHER PUBLICATIONS

USPTO; Non-Final Office Action issued in U.S. Appl. No. 16/023,739, dated Aug. 23, 2021; 41 pages.

(Continued)

*Primary Examiner* — Raymond N Phan

(74) *Attorney, Agent, or Firm* — Alliance IP, LLC

(57) ABSTRACT

Systems and devices can include an upstream port, a downstream port, and a multilane link connecting the upstream port to the downstream port, the multilane link comprising a first link width. The upstream port or the downstream port can be configured to determine that the downstream port is to operate using a second link width, the second link width less than the first link width; transmit to the upstream port an indication of a last data block for the first link width across one or more lanes of the multilane link; cause a first set lanes to enter an idle state; and transmit data on a second set of lanes, the second set of lanes defining the second link width.

22 Claims, 13 Drawing Sheets

(56) References Cited

U.S. PATENT DOCUMENTS

| | | |
|---|---|---|
| 9,244,872 B2 | 1/2016 | Barbiero et al. |
| 9,355,058 B2 | 5/2016 | Iyer et al. |
| 10,601,425 B2 | 3/2020 | Sharma |
| 10,846,247 B2 | 11/2020 | Sharma |
| 2005/0160212 A1 | 7/2005 | Caruk |
| 2006/0023633 A1 | 2/2006 | Caruk et al. |
| 2007/0150762 A1 | 6/2007 | Sharma et al. |
| 2007/0234080 A1 | 10/2007 | Mackey et al. |
| 2009/0040373 A1 | 2/2009 | Lo |
| 2011/0106989 A1 | 5/2011 | Solomon et al. |
| 2011/0158261 A1 | 6/2011 | Chen |
| 2011/0222111 A1 | 9/2011 | Shima |
| 2012/0005512 A1 | 1/2012 | Chew |
| 2012/0079156 A1 | 3/2012 | Safranek et al. |
| 2012/0082463 A1 | 4/2012 | Kasprzyk |
| 2012/0191921 A1 | 7/2012 | Shaeffer et al. |
| 2014/0006674 A1 | 1/2014 | Chan et al. |
| 2014/0006675 A1* | 1/2014 | Meir ............ G06F 13/423 710/314 |
| 2014/0114887 A1 | 4/2014 | Iyer et al. |
| 2014/0115207 A1 | 4/2014 | Iyer et al. |
| 2014/0195833 A1 | 7/2014 | Wang et al. |
| 2015/0092791 A1 | 4/2015 | Cornett et al. |
| 2016/0041604 A1* | 2/2016 | Choi ............ G06F 13/4282 710/313 |
| 2016/0147705 A1 | 5/2016 | Arroyo et al. |
| 2016/0179427 A1* | 6/2016 | Jen ............ G06F 3/0625 711/147 |
| 2016/0179647 A1 | 6/2016 | Sharma et al. |
| 2016/0179730 A1 | 6/2016 | Halleck et al. |
| 2016/0182154 A1 | 6/2016 | Fang et al. |
| 2016/0216758 A1* | 7/2016 | Kachare ............ G06F 1/3253 |
| 2016/0283112 A1 | 9/2016 | Blankenship |
| 2016/0283375 A1 | 9/2016 | Sharma et al. |
| 2016/0377679 A1 | 12/2016 | Froelich et al. |
| 2017/0116090 A1 | 4/2017 | Arroyo et al. |
| 2017/0163286 A1* | 6/2017 | Wu ............ G06F 13/36 |
| 2017/0351640 A1 | 12/2017 | Nilange et al. |
| 2017/0371831 A1* | 12/2017 | Das Sharma ....... G06F 13/4068 |
| 2019/0041898 A1 | 2/2019 | Harriman et al. |
| 2019/0042524 A1 | 2/2019 | Sharma |
| 2019/0131974 A1 | 5/2019 | Sharma |
| 2019/0196991 A1 | 6/2019 | Sharma |
| 2019/0286605 A1* | 9/2019 | Harriman ............ G06F 13/4226 |
| 2020/0226084 A1 | 7/2020 | Sharma |
| 2020/0287548 A1 | 9/2020 | Sharma |

OTHER PUBLICATIONS

USPTO; Final Office Action issued in U.S. Appl. No. 16/826,001, dated Mar. 31, 2021; 29 pages.

EPO; Extended European Search Report issued in EP Patent Application No. 20155557.0, dated May 25, 2020; 11 pages.

USPTO; Non-Final Office Action issued in U.S. Appl. No. 16/219,883, dated Jul. 22, 2019; 30 pages.

USPTO; Non-Final Office Action issued in U.S. Appl. No. 16/826,001, dated Nov. 6, 2020; 25 pages.

USPTO; Notice of Allowance issued in U.S. Appl. No. 16/219,883, dated Nov. 7, 2019; 10 pages.

Wikipedia, "PCI Express," Published (2019); available online at https://en.wikipedia.org/wiki/PCI_Express.

EPO; Extended European Search Report issued in EP Patent Application No. 20217133.6, dated Jun. 10, 2021; 16 pages.

PCI Express; "PCI Express Base Specification Rev. 4.0 Version 1.0," downloaded from https://pdfcoffee.com/pcie-gen-4-spec-pdf-free.html; Sep. 27, 2017; 1293 pages.

USPTO; Final Office Action issued in U.S. Appl. No. 16/023,739, dated Feb. 22, 2022; 42 pages.

USPTO; Notice of Allowance issued in U.S. Appl. No. 16/826,001, dated Sep. 22, 2021; 32 pages.

\* cited by examiner

TECHNOLOGIES FOR PARTIAL LINK WIDTH STATES FOR MULTILANE LINKS

CROSS-REFERENCE TO RELATED APPLICATIONS

This Application is a continuation (and claims the benefit of priority under 35 U.S.C. § 120) of U.S. application Ser. No. 16/293,269, filed Mar. 5, 2019 and entitled PARTIAL LINK WIDTH STATES FOR MULTILANE LINKS. The disclosure of the prior Application is considered part of and is incorporated by reference in the disclosure of this Application.

BACKGROUND

Interconnects can be used to provide communication between different devices within a system, some type of interconnect mechanism is used. One typical communication protocol for communications interconnects between devices in a computer system is a Peripheral Component Interconnect Express (PCI Express™ (PCIe™)) communication protocol. This communication protocol is one example of a load/store input/output (I/O) interconnect system. The communication between the devices is typically performed serially according to this protocol at very high speeds.

Devices can be connected across various numbers of data links, each data link including a plurality of data lanes. Upstream devices and downstream devices undergo link training upon initialization to optimize data transmissions across the various links and lanes.

DETAILED DESCRIPTION

Figure 1:
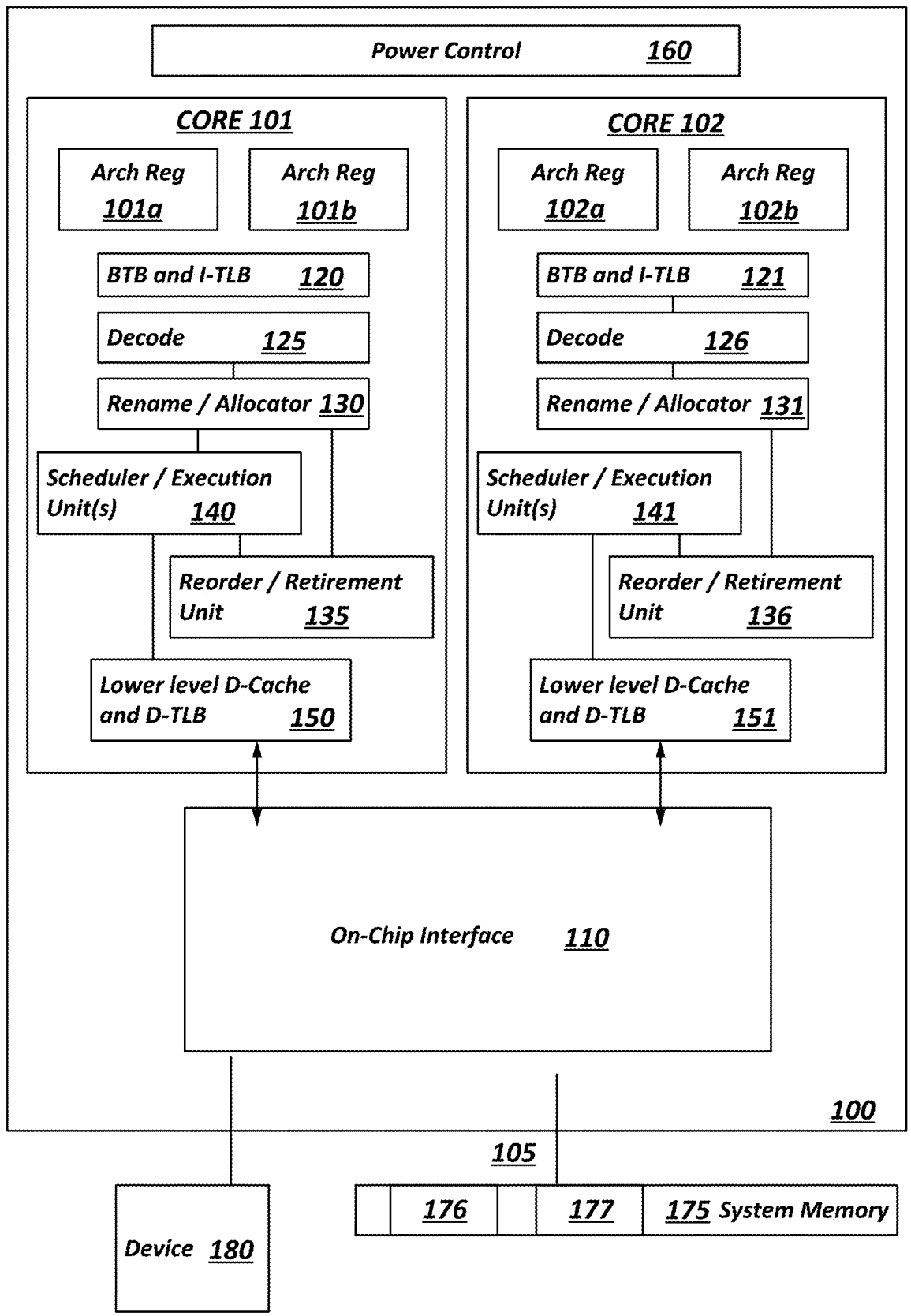
FIG. 1 illustrates an embodiment of a block diagram for a computing system including a multicore processor in accordance with embodiments of the present disclosure.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or includes an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices.

Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example, in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point Link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

For a multilane link, such as a link based on PCIe, the average I/O link utilization is typically less than 50% even for the thermal design power use case. Dynamic link width (DLW) adjustment (also known as link width up configure/down configure), where the link goes from L0 to Recovery to Configuration to L0 can be used to address less than optimal link width utilization. DLW adjustment, however, can take several micro-seconds (typically in high single digit to low double-digits) when the link is unavailable for exchanging transactions, which represents orders of magnitude increase in latency over when the link is in the L0 state. Such latency prevents the use of the DLW adjustment mechanism widely in practicality, as DLW adjustment may introduce excessive latency if the transaction is caught up during the link width up/down configure, leading to higher power consumption.

This disclosure describes a mechanism that allows the link to be partially active (e.g., enter a partial L0 (PL0) sub-state) and allows transactions to proceed on some lanes, while other lanes are performing the electrical idle entry (link width down configure) or exit (link width up configure). The PL0 sub-state offers the deep power savings that the L1 power saving state offers on the Lanes that go to idle. The PL0 sub-state can achieve low latency during the transition to/from the low power link states, which makes the PL0 sub-state compelling to be deployed aggressively. Such aggressive deployment would facilitate the dynamic allocation of power to other entities (e.g., cores) by taking power away from the I/O during reduced bandwidth periods (or by matching the real consumption bandwidth).

Figure 2B:
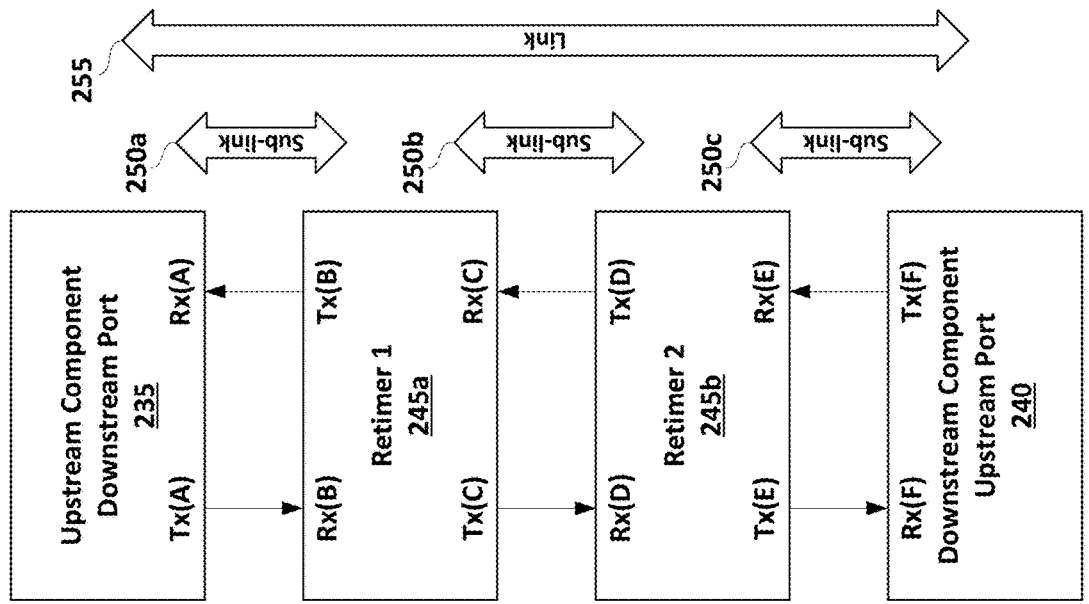
FIGS. 2A-2B are simplified block diagrams of example links that include one or more retimers in accordance with embodiments of the present disclosure.
Figure 2A:
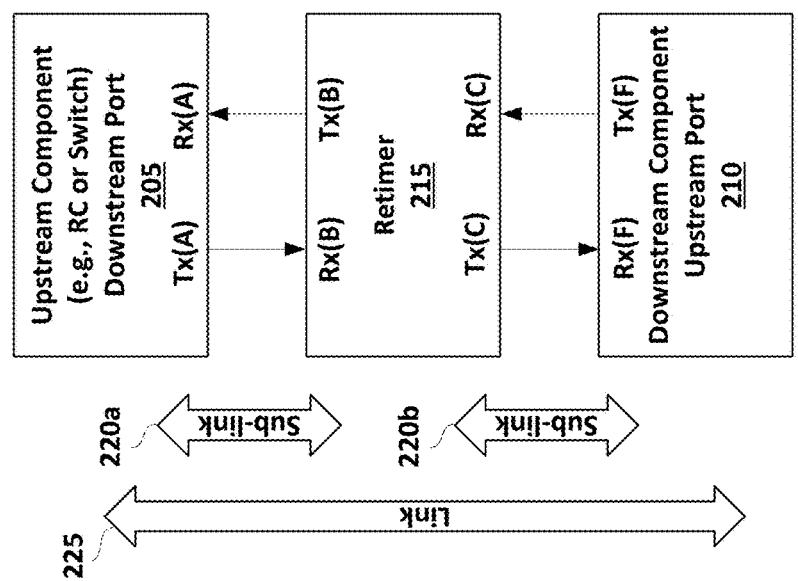

This disclosure describes a mechanism for power savings in multilane, serial interconnects such as PCIe (as shown in FIGS. 2A-B below), which enables the power consumption to be proportionate to bandwidth consumption, without causing link down time.

FIGS. 2A-2B are simplified block diagrams of example links that include one or more retimers in accordance with embodiments of the present disclosure. A link incorporating one or more retimers can form two or more separate electrical sub-links at data rates comparable to data rates realized by links employing similar protocols but with no retimers. For instance, a link including a single retimer can form a link with two separate sub-links, each operating at 8.0 GT/s or higher. FIGS. 2A-2B illustrate simplified block diagrams 200a-b of example links including one or more retimers. For instance, in FIG. 2A, a link 225 connecting a first component 205 (e.g., an upstream component, such as a root complex or port switch) to a second component 210 (e.g., a downstream component) can include a single retimer 215a. A first sublink 220a can connect the first component 205 to the retimer 215a and a second sublink 220b can connect the retimer 215a to the second component.

In some implementations, a link, such as a PCIe-compliant link, can include one or more retimers or other extension devices, such as a repeater. A retimer device (or simply "retimer"), can include active electronic devices that receive and re-transmit (retime) digital I/O signals. Retimers can be used to extend the length of a channel that can be used with a digital I/O bus. Retimers can be protocol aware, software transparent, and capable of executing a link equalization procedure, such as the link equalization procedure of PCIe.

As shown in FIG. 2B, multiple retimers 245a, 245b can be utilized to extend a link 255. Three sublinks 250a-c can be defined through the two retimers 245a, 245b, with a first sublink 255a connecting the first component 235 to the first retimer 245a, a second sublink 250b connecting the first retimer 245a to the second retimer 245b, and the third sublink 255c connecting the second retimer 245b to the second component 240.

A primary function of a retimer (buffer) device is signal re-timing. These functions are performed by re-timer circuitry blocks 506 (one block for each direction), as shown. The particular retimer device circuits will depend on the PHY being used for the link. Generally, retimer circuitry is configured to recover the incoming signal and retransmit using a local clock and new transmit equalization circuitry, and may typically employ well-known circuitry for this purpose, such as phase lock loops. A retimer may further comprise transmitter and receiver circuitry including one or more amplifier circuits, as well as various types of well-known signal-conditioning circuitry used to increase the drive level of a received signal. Such retimer circuitry is well-known to those skilled in the high-speed interconnect arts, and, accordingly, no further details are shown or discussed herein.

Each retimer 215, 245a, 245b can have an upstream path and a downstream path. In some implementations, a retimer can include two pseudo ports, and the pseudo ports can determine their respective downstream/upstream orientation dynamically. Further, retimers 215, 245a, 245b can support operating modes including a forwarding mode and an executing mode. Retimers 215, 245a, 245b in some instances can decode data received on the sub-link and re-encode the data that it is to forward downstream on its other sublink. As such, retimers may capture the received bit stream prior to regenerating and re-transmitting the bit stream to another device or even another retimer (or redriver or repeater). In some cases, the retimer can modify some values in the data it receives, such as when processing and forwarding ordered set data. Additionally, a retimer can potentially support any width option as its maximum width, such as a set of width options defined by a specification such as PCIe.

As data rates of serial interconnects (e.g., PCIe, UPI, USB, etc.) increase, retimers are increasingly used to extend the channel reach. Multiple retimers can be cascaded for even longer channel reach. It is expected that as signal speeds increase, channel reach will typically decrease as a general matter. Accordingly, as interconnect technologies accelerate, the use of retimers may become more common. As an example, as PCIe Gen-4, with its 16 GT/s, is adopted in favor of PCIe Gen-3 (8 GT/s), the use of retimers in PCIe interconnects may increase, as may be the case in other interconnects as speeds increase.

In one implementation, a common BGA (Ball Grid Array) footprint may be defined for PCI Express Gen-4 (16 GT/s) based retimers. Such a design may address at least some of the example shortcomings found in conventional PCIe Gen-3 (8 GT/s) retimer devices, as well as some of the issues emerging with the adoption of PCIe Gen-4. Further, for PCIe Gen-4, the number of retimer vendors and volume are expected to increase. Due to signal losses from the doubled data rate (from 8 GT/s to 16 GT/s), the interconnect length achievable is significantly decreased in Gen-4. In this and other example interconnect technologies, as data rate increases, retimers may thereby have increased utility as they can be used to dramatically increase channel lengths that would be otherwise constrained by the increased data rate.

Although shown to be separate from the upstream component and downstream component, the retimer can be part of the upstream or downstream components, on board with the upstream or downstream components, or on package with the downstream component.

An upstream component 205 and downstream component 210 can be connected directly, in some instances, with no retimers, redrivers, or repeaters disposed on the link between the two components 205, 210. In other instances, a retimer (e.g., 215) can be provided to extend the link connecting upstream component 205 and downstream component 210, such as illustrated in FIG. 2A. In still other implementations, two or more retimers (e.g., 245a, 245b) can be provided in series to further extend a link connecting upstream component 235 and downstream component 240. For instance, a particular interconnect technology or protocol may specify a maximum channel length and one or more retimers (e.g., 245a, 245b), can be provided to extend the physical length of the channel connecting two devices 235 and 240. For instance, providing retimers 245a, 245b between upstream component 235 and downstream component 240 can allow a link three times the maximum length specified for a link without these retimers e.g., 245a, 245b, among other example implementations.

In embodiments, the mechanism for power savings can be implemented in serial interconnects such as PCIe, which enables the power consumption to be proportionate to bandwidth consumption, without causing link down time. FIGS. 2A-B show typical PCIe based systems that can implemented the mechanisms described herein. The Downstream Port (DSP) of an Upstream Component 205 or 235 (e.g., a CPU), connects to the Upstream Port (USP) of a Downstream Component 210 or 240 (e.g., networking card, storage, or accelerator), and in some implementations, through one or more retimers 215, 245a, 245b. The USP and the DSP control the link width, and the retimers follow the lead of the USP or DSP. The retimers are configured to understand the tokens that are exchanged and understand how the lanes are changing.

Figure 3:
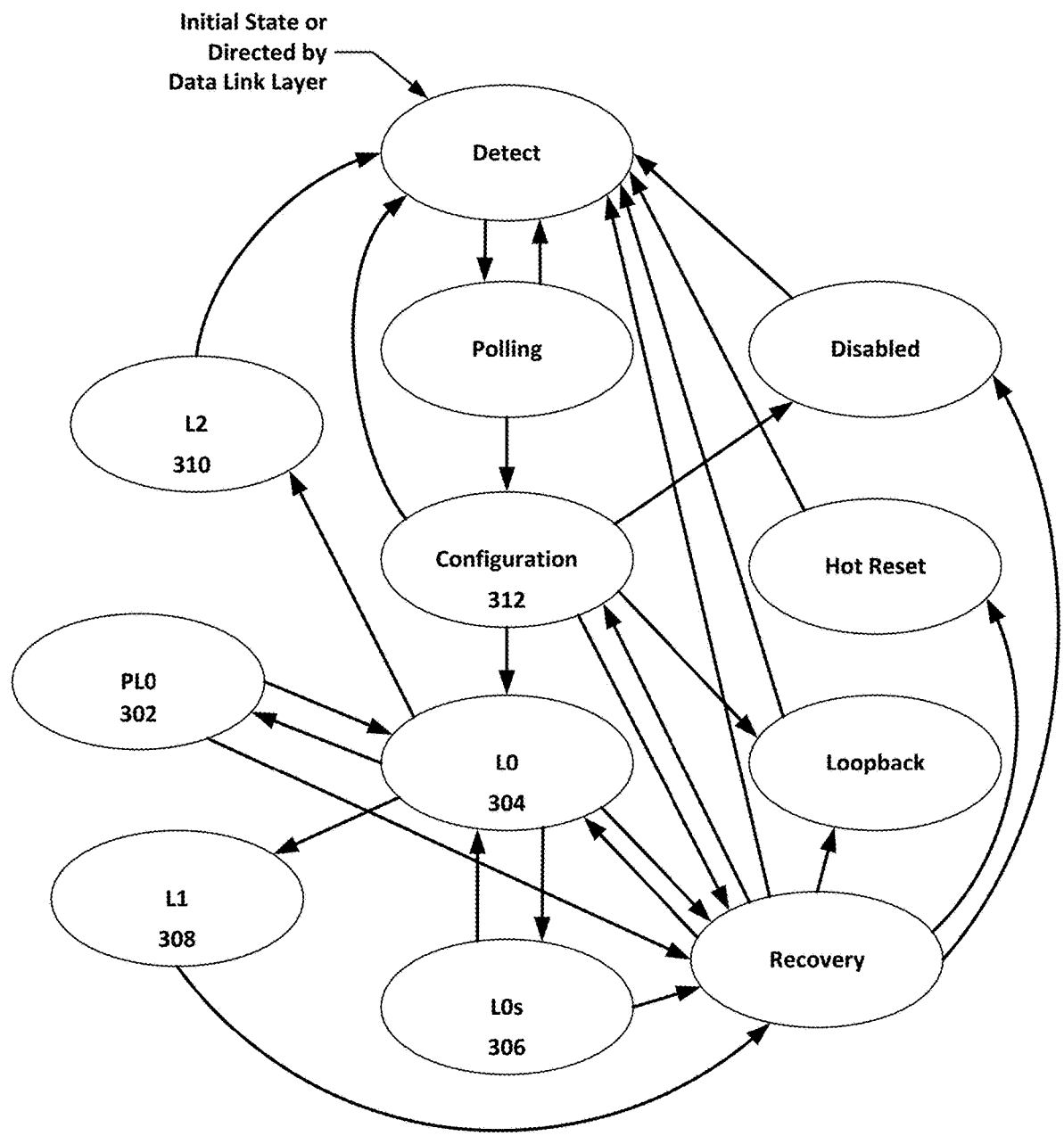
FIG. 3 is a schematic diagram illustrating an example link training state machine that includes a partial L0 (PL0) state in accordance with embodiments of the present disclosure.

Turning to the diagram 300 of FIG. 3, an example link training state machine is shown, such as the PCIe link training and status state machine (LTSSM). FIG. 3 is a schematic diagram illustrating an example link training state machine 300 that includes a partial L0 (PL0) state in accordance with embodiments of the present disclosure. For a system utilizing a PHY according to a particular protocol to support multiple alternative protocols (i.e., to run on top of the PHY), ordered sets may be defined that are to be communicated between two or more devices on a link in connection with the training of the link. For instance, training set (TS) ordered sets (OSes) may be sent. In an implementation utilizing PCIe as the PHY protocol, the TS ordered sets may include a TS1 and a TS2 ordered set, among other example ordered sets. The ordered sets and training sequences sent during link training may be based on the particular link training state, with various link training states utilized to accomplish corresponding link training activities and objectives.

Link training state machine 300 can illustrate a link training and state status machine (LTSSM) representative of various states of a multilane link, such as that based on the PCIe protocol. In one example, such as illustrated in FIG. 3, a link training state machine 300 may include such states as a Reset state, a Detect state (e.g., to detect a far end termination (e.g., another device connected to the lanes), a Polling state (e.g., to establish symbol lock and configure lane polarity), a Configuration (or "Config") state (e.g., to configure the physical lanes of a connection into a link with particular lane width, lane numbering, etc., performing lane-to-lane deskew and other link configuration activities), a Loopback state (e.g., to perform testing, fault isolation, equalization, and other tasks), a Recovery state (e.g., for use to change the data rate of operation, re-establish bit lock, Symbol lock or block alignment, perform lane-to-lane deskew, etc.) among other states, which may be utilized to bring the link to an active link state (e.g., L0 304). The LTSSM 300 also illustrates various power states: fully active state (L0 304), electrical idle or standby state (L0s 306), L1 (lower power standby/slumber state 308), L2 (low power sleep state 310), and L3 (link Off state). The LTSSM 300 also illustrates the partial L0 (PL0) state 302, which is the sub-state described herein.

In one example, training sequences to be sent in a particular one (or more) of the link training states may be defined to accommodate the negotiation of a particular one of the supported protocols of a particular device. For instance, the particular training state may be a training state preceding entry into an active link state, or a training state in which the data rate may be upscaled (e.g., beyond that supported by at least one of the supported protocols), such as a PCIe state where a data rate transitions from a Gen1 speed to Gen3 and higher speeds, among other examples. For instance, in the example implementation shown in FIG. 3, a configuration state (e.g., 312) may be utilized and augmented to allow negotiation of a particular one of multiple protocols in parallel with the link training activities defined natively in the training state (e.g., lane width determination, lane numbering, deskew, equalization, etc.). For instance, particular training sequences may be defined for the training state and these training sequences may be augmented to allow information to be communicated (e.g., in one or more fields or symbols of the ordered set) to identify whether each device on the link supports multiple protocols (e.g., at least one protocol stack other than the protocol stack of the physical layer and the corresponding link training state machine), identify the particular protocols each device supports, and agree upon one or more protocols to employ over the particular PHY (e.g., through a handshake accomplished through the transmission of these training sequences across the link (in both the upstream and downstream directions)).

In one example, a PCIe physical layer may be utilized to support multiple different protocols. Accordingly, a particular training state in a PCIe LTSSM may be utilized for the negotiation of protocols between devices on a link. As noted above, the protocol determination may occur even before the link trains to an active state (e.g., L0 304) in the lowest supported data rate (e.g., the PCIe Gen 1 data rate). In one example, the PCIe Config state may be used. Indeed, the PCIe LTSSM may be used to negotiate the protocol by using modified PCIe Training Sets (e.g., TS1 and TS2) after the link width negotiation and (at least partially) in parallel with lane numbering performed during the Config state.

To support the link width adjustment mechanism described herein, the PCIe LTSSM is enhanced with a new state called PL0 302. Entry to this state occurs from L0 304 when one side intends to operate the link at a narrower width than the maximum configured link width negotiated to L0 304. While in this new state, the link continues the same way as in L0 304, but on a narrower width, while the remaining lanes are in the electrical idle (EI), similar to L1 308. If there are PLL(s) (Phase Locked Loop) associated only with the lanes that are in electric idle (EI), they can be turned off too. More lanes may be added to EI while in PL0 state and some of the lanes that are in EI can be turned on also. If the link operates at the maximum configured link width, the LTSSM enters the state L0 304. If a Link Up-configure effort times out in PL0, the link enters Recovery, which will turn on all the lanes.

As an example, a multilane link can include 16 lanes. At some point, 4 lanes (0-3) can be active, while 12 lanes are in a low power or sleep mode. If the system wants to bring up 4 additional lanes, 4 trains are retrained. Then, when there's a break in lanes 0-3, all 8 lanes are sent packet or token to get all 8 lanes to behave the same way. The 8 lanes can be down configured as well to return to 4 lanes.

Figure 4:
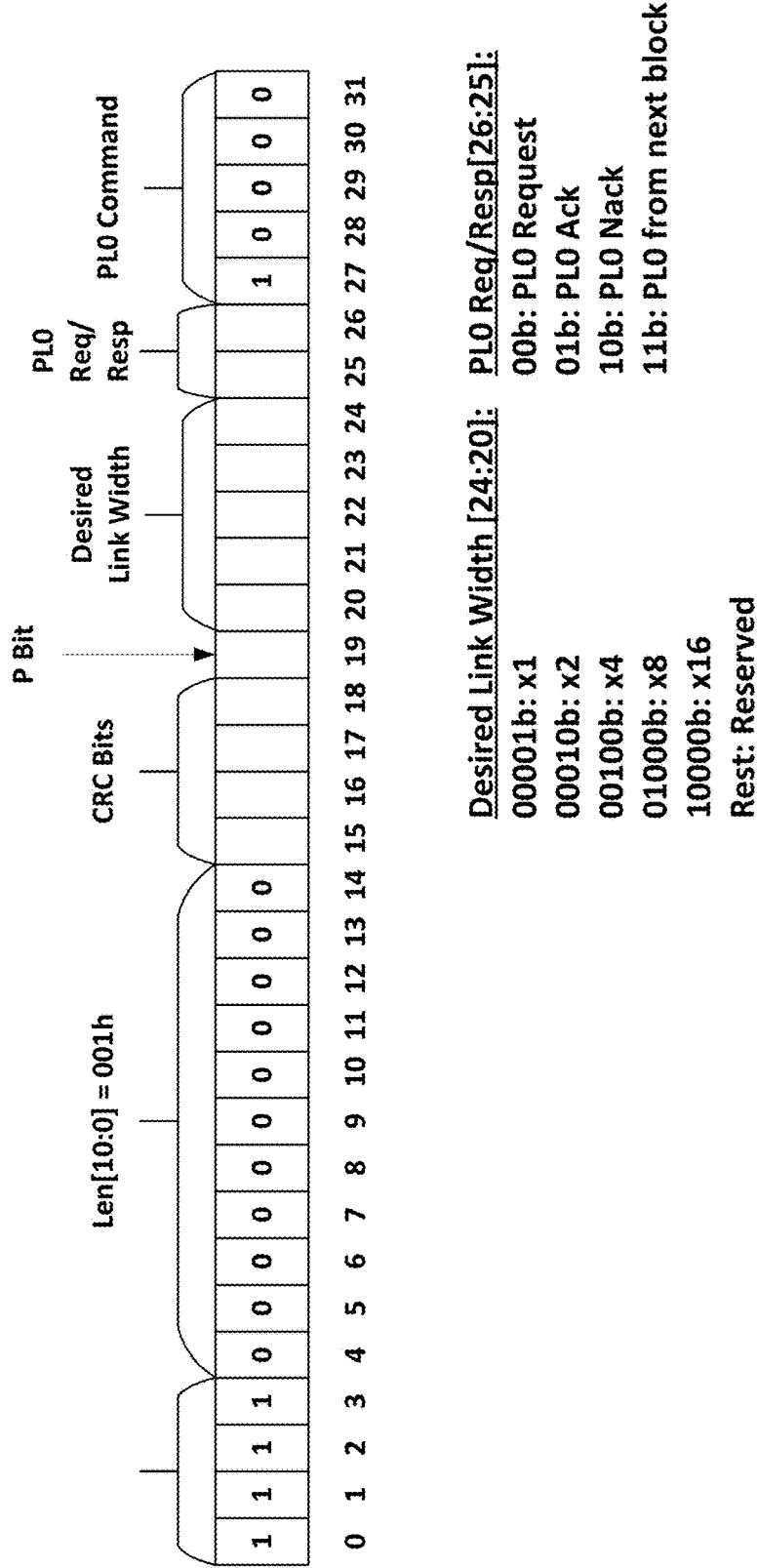
FIG. 4 is a schematic diagram illustrating an example token for exchanging partial L0 state requests including response and width information in accordance with embodiments of the present disclosure.

Link width down-configure from L0 or PL0 is negotiated through special PL0 token, which can be similar to an EDS (End Data Stream) Token, and is shown in FIG. 4. FIG. 4 is a schematic diagram illustrating an example token 400 for exchanging partial L0 state requests including response and width information in accordance with embodiments of the present disclosure. This token is of length 1 DW (one double word) and uses the STP encoding with a length field of 1, similar to EDS. However, PL0 Token uses different values in bits [31:20], as shown in FIG. 4. These bit fields indicate the different phases of negotiation and the desired width, as shown in FIG. 4. Example bit values are shown in FIG. 4, though other configurations are also possible:

| PL0 Req/Resp [26:25] | |
| --- | --- |
| 00b: | PL0 Request |
| 01b: | PL0 Ack |
| 10b: | PL0 Nack |
| 11b: | PL0 from next block |
| 00b: | PL0 Request |
| Desired Link Width [24:20] | |
| 00001b: | x1 |
| 00010b: | x2 |
| 00100b: | x4 |
| 01000b: | x8 |
| 10000b: | x16 |
| Rest: | Reserved |

Figure 5A:
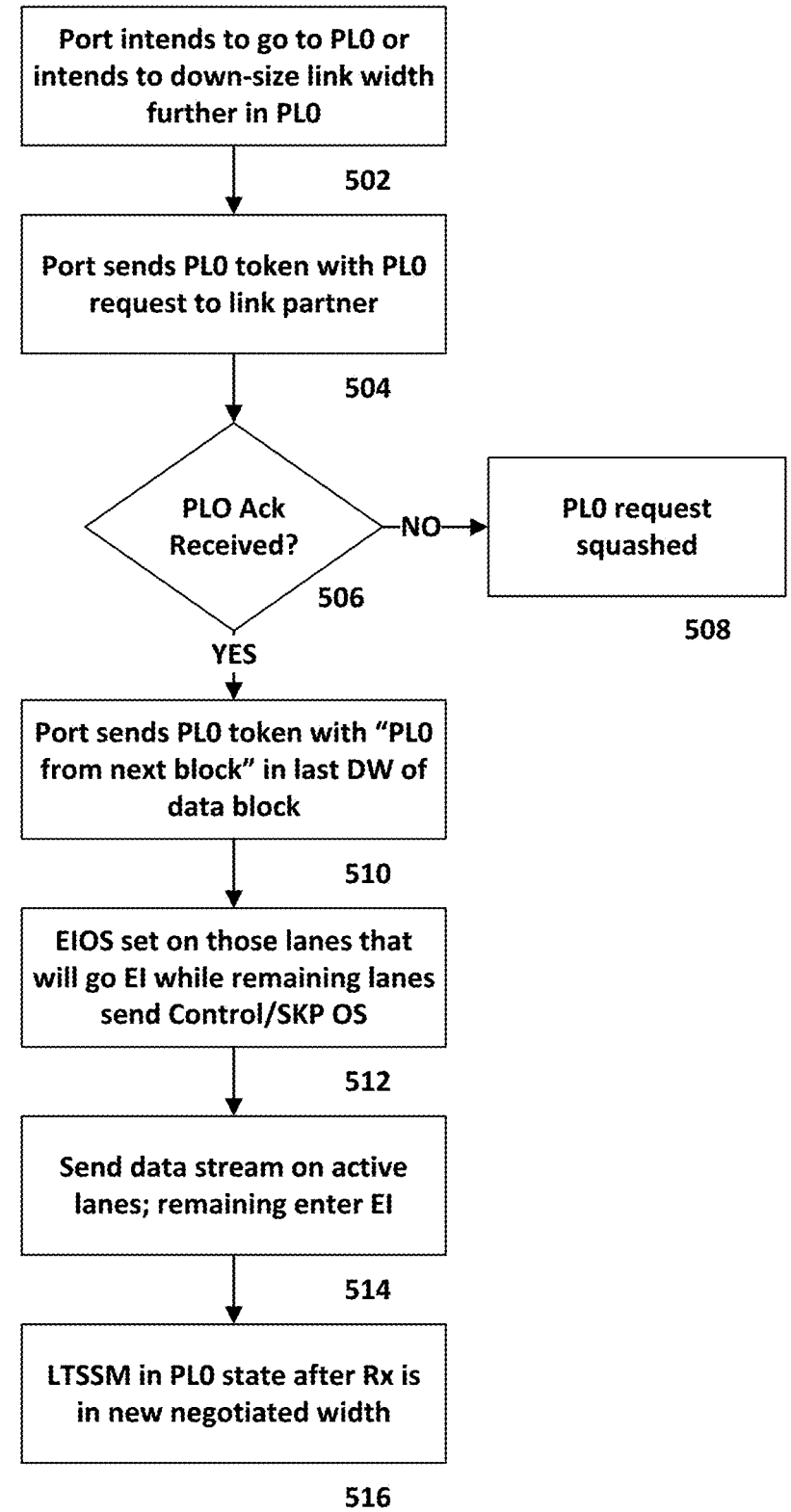
FIG. 5A is a process flow diagram for prompting and negotiating a link width down configuration in accordance with embodiments of the present disclosure.
Figure 5B:
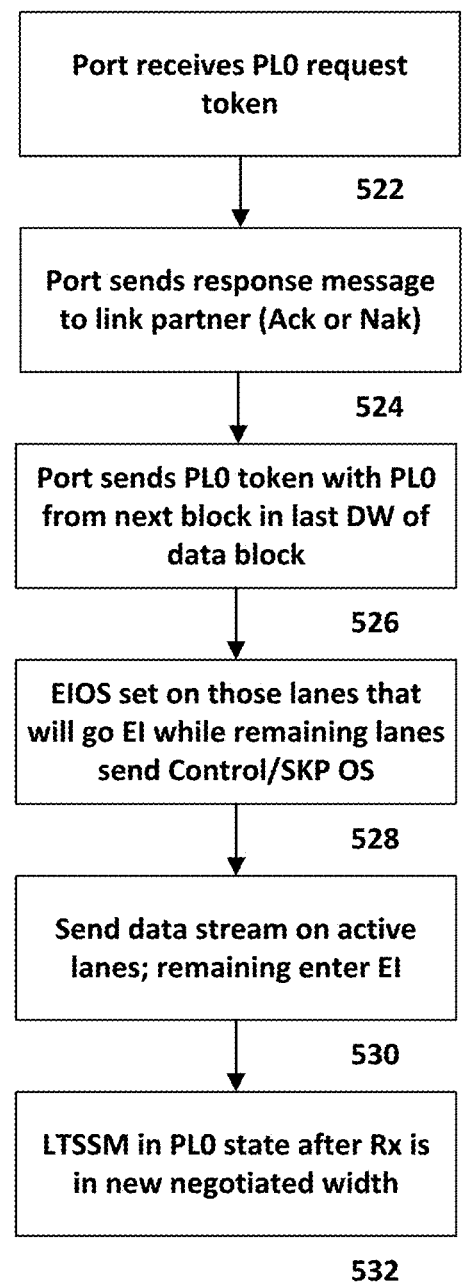
FIG. 5B is a process flow diagram illustrating link partner actions upon receiving a PL0 request token in accordance with embodiments of the present disclosure.

FIGS. 5A-B describe the process of link width down configuration. FIG. 5A is a process flow diagram 500 for prompting and negotiating a link width down configuration in accordance with embodiments of the present disclosure. When the link is operating in L0 or PL0, a port can determine to down-configure from L0 to PL0 or to down configure from PL0 to a lower link width in PL0 (502). The port that intends to down size the link sends the PL0 Request Token across one or more active lanes to a link partner (504). The port waits for a response (ACK or NAK) (506). If a PL0 NAK response is received or the link enters recovery, L0 or L1, then the PL0 request is squashed (508). That is, the down configuration requested has been rejected by the link partner and the request process ends.

If a PL0 Ack response is received by the port from the link partner, the link can go to the reduced width. Ports on either side of the link wait till the next scheduled (Control) SKP OS (SKiP Ordered Set). Instead of the EDS Token to signify the end of data stream, the port sends the "PL0 from next Block" Token in the last DW of the current Data Stream (510). The port then sends Control or SKP OS on the lanes that will remain active and Electrical Idle Ordered Set (EIOS) on the lanes that will go to Electrical Idle (EI) (512).

The "PL0 from next Block" Token signifies the end of the current Data Stream as well as the reduced width, as encoded in field [24:20] in the Token (shown in FIG. 4 above). The "PL0 from next block" also, by implication, indicates the last data block using the current link width. Thus, there is no downtime of the Link to down-configure the link width. A variation can be to schedule the "PL0 from next Block" Token without waiting for the (Control) SKP Ordered Set boundary and continue with the new width from the following block while sending EIOS on the lanes that need to go EI.

After the last control/SKP OS are sent, the active lanes can be used to transmit data stream; while the inactive lanes enter EI (514). The LTSSM is in PL0 after the link partner has completed the opposite direction down-configure (516).

FIG. 5B is a process flow diagram 520 illustrating link partner actions upon receiving a PL0 request token in accordance with embodiments of the present disclosure. The link partner can be referred to here as a port. The port can receive a PL0 request token (522). The port can send a response back to the link partner, such as an ACK or NAK (524). For this example, assume the port sends an ACK, which allows the process to continue. The port can send a PL0 token with the "PL0 from next block" in the last DW of the data block (526). The port then sends Control or SKP OS on the lanes that will remain active and Electrical Idle Ordered Set (EIOS) on the lanes that will go to Electrical Idle (EI) (528).

After the last control/SKP OS are sent, the active lanes can be used to transmit data stream; while the inactive lanes enter EI (530). The LTSSM is in PL0 after the link partner has completed the opposite direction down-configure (532).

Figure 5C:
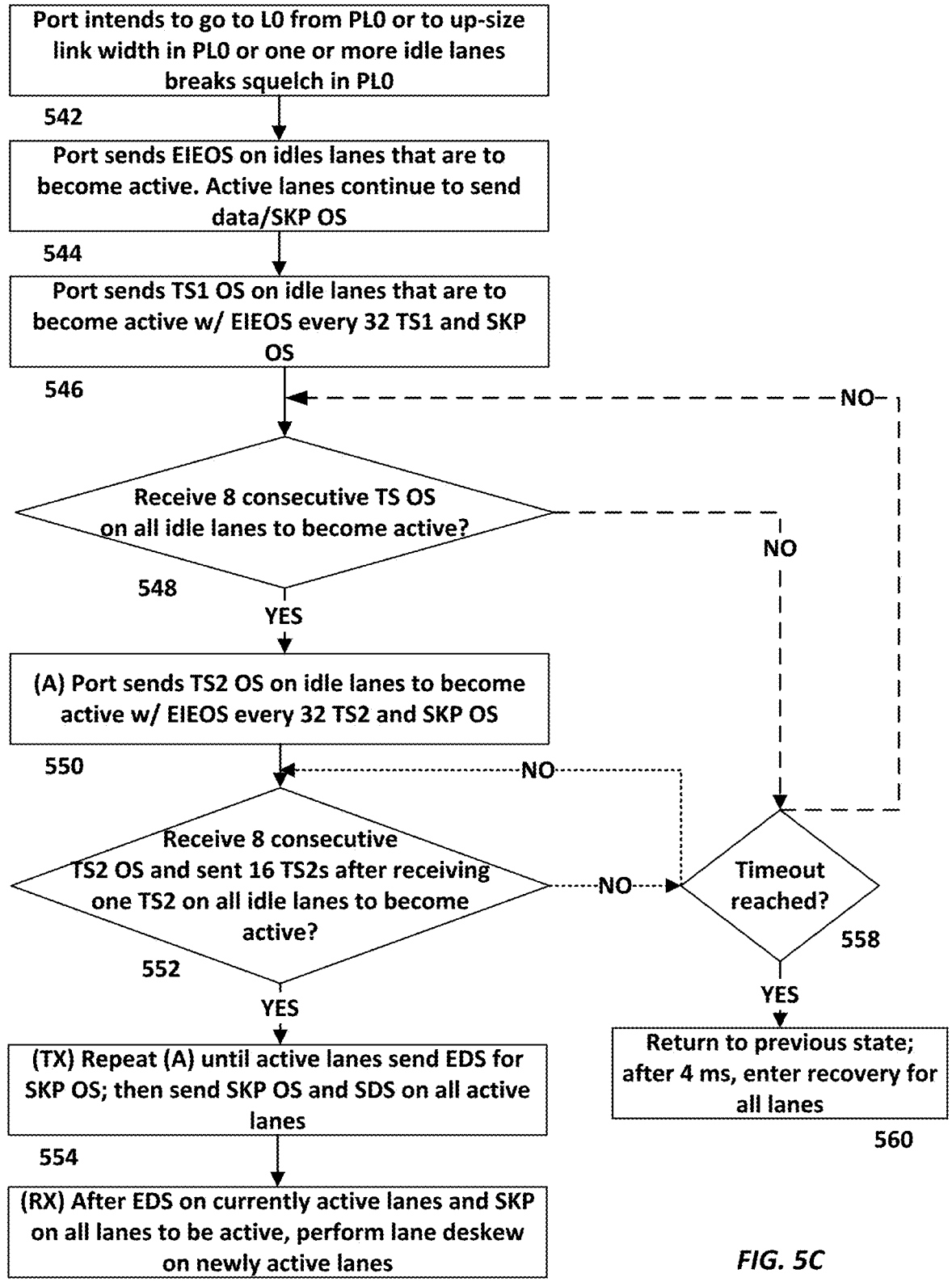
FIG. 5C is a process flow diagram for negotiating a link width up configure in accordance with embodiments of the present disclosure.

FIG. 5C is a process flow diagram 540 for negotiating a link width up configuration in accordance with embodiments of the present disclosure. The Link width Up-configure can be requested by any Link Partner, irrespective of who may have initiated the down configure request(s). FIG. 5C illustrates the process. The lanes that are to be reactivated go through a Recovery style handshake (waking up the Lanes, acquiring bit lock, Block alignment, stabilizing the lanes, etc.), while the normal traffic flow continues on the active lanes. Once the reactivated lanes are ready to be activated, the port independently waits for the (Control) SKP OS boundary, sends the scheduled (Control) SKP OS on the currently active+to be reactivated Lanes followed by an (Start Data Stream) SDS OS on the Lanes, which is used for de-skewing across all the Lanes (previously active+newly reactivated Lanes). The transactions only stall for this additional SDS OS, which is less than 5 ns for a 32G Link. Once both the Transmit and Receive side are fully up-configured, the up-configure process is deemed to be completed by the Port. On completion, if the Link is operating at the maximum configured width, the LTSSM transitions to L0 from L0_L1p state.

Turning the flowchart, at the outside, a port can intend to up configure (e.g., transition from PL0 to L0, up-size within PL0, or break idle on some lanes in PL0) (542). The port can send an EIEOS on idle lanes that are to become active (544). Active lanes continue to send data or SKP OS. Then, the port can send TS1 OS on idle lanes that are to become active with EIEOS every 32 TS1 OS and SKP OS across the lanes to become active (546).

After the port receives 8 consecutive TS1 or TS2 OS on all idle lanes to become active (548), the port can send TS2 OS on idle lanes to become active with EIEOS every 32 TS2 and SKP OS across all lanes to become active (550) (this step can be referred to as (A)). After the port receives 8 consecutive TS2 OS and sent 16 TS2 OS after receiving one TS2 on all idle lanes to become active (552), the port can repeat (A) until active lanes send an EDS for SKP OS; then, the port can send SKP OS and SDS on all active lanes (554) (for TX lanes). The port can also, after an EDS on currently active lanes and SKP on all lanes to become active, deskew newly active lanes (556). If all lanes are active, then the LTSSM state is L0. Otherwise, the LTSSM state is PL0.

A timeout can be used to exit the transition. For example, if more than 24 ms (+/−2 ms) passes without receiving 8 consecutive TS1 or TS2 OS, the port can exit PL0 up configure, and return to whatever PL0 state it was in; then, after a period of time (e.g., 4 ms) return all lanes to Recovery (558, 560).

Figure 5D:
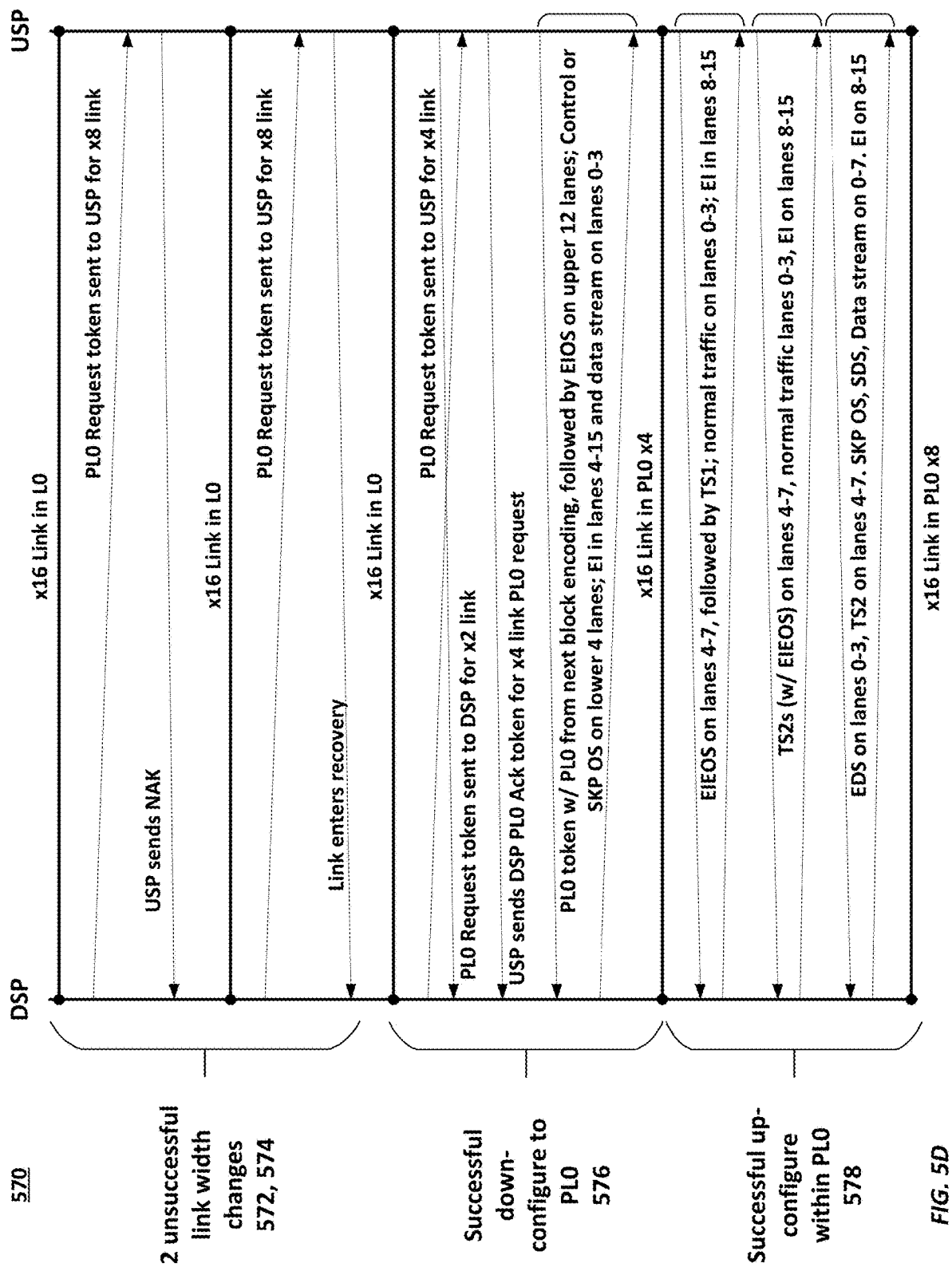
FIG. 5D is a swim lane diagram illustrating various embodiments for negotiating link width reconfigurations in accordance with embodiments of the present disclosure.

FIG. 5D is a swim lane diagram 570 illustrating various embodiments for negotiating link width reconfigurations in accordance with embodiments of the present disclosure. The first attempt at Link width down-configure fails since the Link partner Naks the request. The second attempt fails as the Link enters Recovery prior to the down-configure completing. The third attempt succeeds: the two sides almost simultaneously make the request. Hence the DSP's request for down-configuring to ×4 stands, which the USP Ack's and the Link operates at ×4 width, while the LTSSM enters L0_L1p state. After that the up-configure request to take the Link to a ×8, initiated by the USP succeeds and the Link ends at a ×8 width while still being in the L0_L1p state.

The first two examples illustrate unsuccessful link width adjustments. At the outset, an ×16 link with operating in L0. In 572, the DSP sends PL0 request token to the USP to transition from ×16 L0 to ×8 PL0. The USP responds with a NAK, which ends the request. Likewise, in 574, the DSP sends a PL0 request token to transition from ×16 L0 to ×8 PL0, but the USP enters recovery, which also terminates the request. If a Link enters Recovery or a low power state from L0 while the Link width down configure request has not completed, the entire process is squashed.

In 576, both link partners transmit down configure requests. It is possible that both sides send the PL0 Request Token independently, without having received the Link Partner's token. Here, the DSP requests a down configure from ×16 L0 to ×4 PL0, while the USP requests a transition from ×16 L0 to ×2 PL0. The DSP's request wins out and the USP has to respond (e.g., here USP responds with an ACK), while the DSP ignores the USP's request. The USP and DSP will each transmit PL0 from next block encodings, followed by EIOS on upper 12 lanes, control or SKP OS on lower 4 lanes, EI on lanes 4-15, and data stream on lanes 0-3.

In 578, a port intends on up configuring from ×4 PL0 to ×8 PL0. Both ports perform the following:

1) EIEOS is transmitted on lanes 4-7, followed by TS1 on lanes 4-7 for link training. Normal traffic is transmitted on lanes 0-3, and EI is transmitted on lanes 8-15 (which are to stay idle).

2) TS2s (with EIEOS) are transmitted on lanes 4-7 to indicate link ready, normal traffic transmitted on lanes 0-3, and EI on lanes 8-15.

3) EDS on lanes 0-3 to signify end of that data stream. TS2 on lanes 4-7, EI on 8-15.

4) SKIP OS, SDS, and data stream on all active lanes 0-7, while continuing EI on 8-15.

Figure 6:
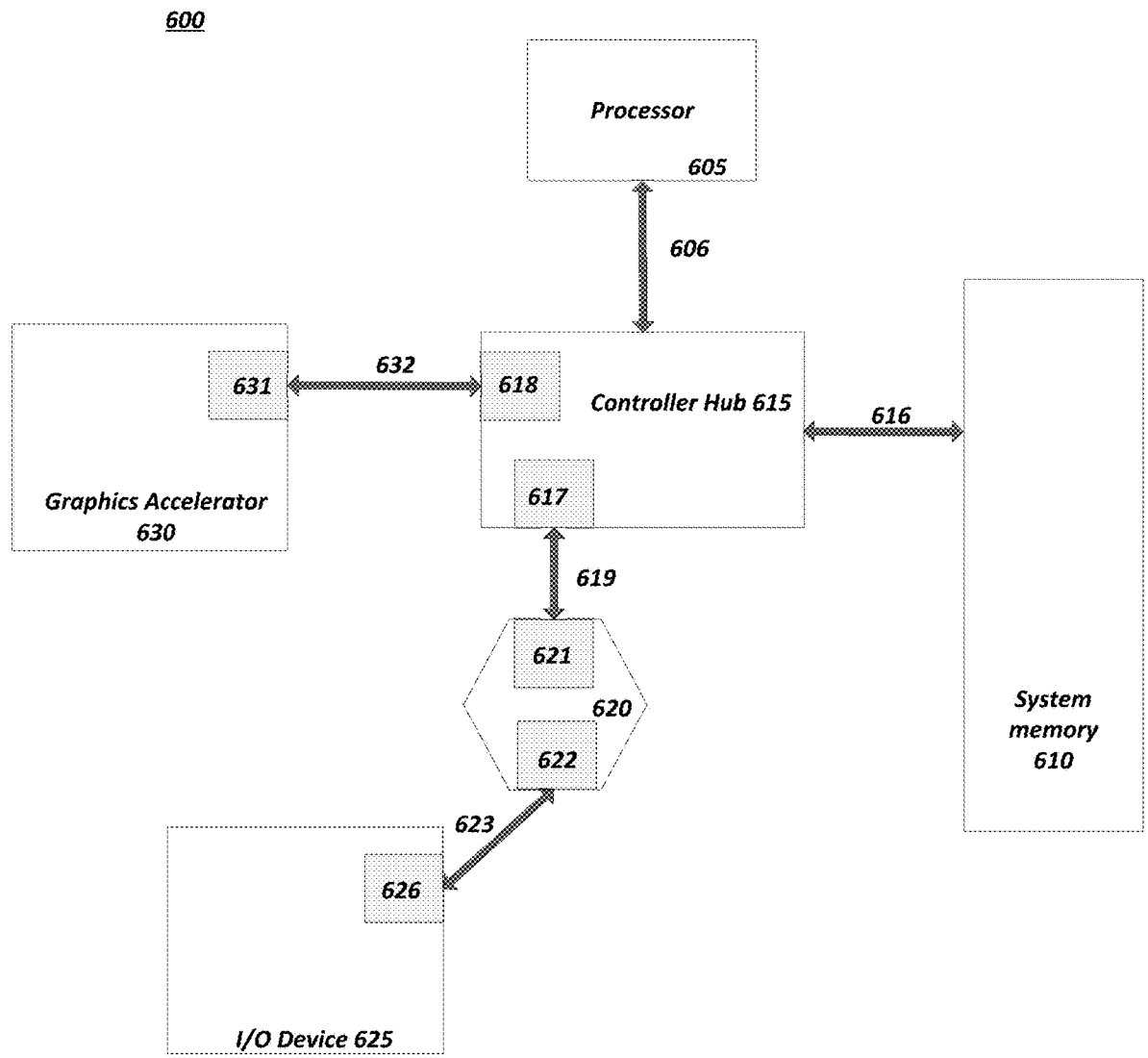
FIG. 6 illustrates an embodiment of a computing system including an interconnect architecture.

Referring to FIG. 6, an embodiment of a fabric composed of point-to-point Links that interconnect a set of components is illustrated. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect as described below. In another embodiment, link 606 includes a serial, differential interconnect architecture that is compliant with different interconnect standard.

System memory 610 includes any memory device, such as random access memory (RAM), non-volatile (NV) memory, or other memory accessible by devices in system 600. System memory 610 is coupled to controller hub 615 through memory interface 616. Examples of a memory interface include a double-data rate (DDR) memory interface, a dual-channel DDR memory interface, and a dynamic RAM (DRAM) memory interface.

In one embodiment, controller hub 615 is a root hub, root complex, or root controller in a Peripheral Component Interconnect Express (PCIe or PCIE) interconnection hierarchy. Examples of controller hub 615 include a chipset, a memory controller hub (MCH), a northbridge, an interconnect controller hub (ICH) a southbridge, and a root port controller/hub. Often the term chipset refers to two physically separate controller hubs, i.e. a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through root complex 615.

Here, controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e. up a hierarchy towards a root complex, to controller hub 615 and downstream, i.e. down a hierarchy away from a root port controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 625 may include a PCIe to PCI/PCI-X bridge to support legacy or other version PCI devices. Endpoint devices in PCIe are often classified as legacy, PCIe, or root complex integrated endpoints.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. Similar to the MCH discussion above, a graphics controller or the graphics accelerator 630 itself may be integrated in processor 605.

Figure 7:
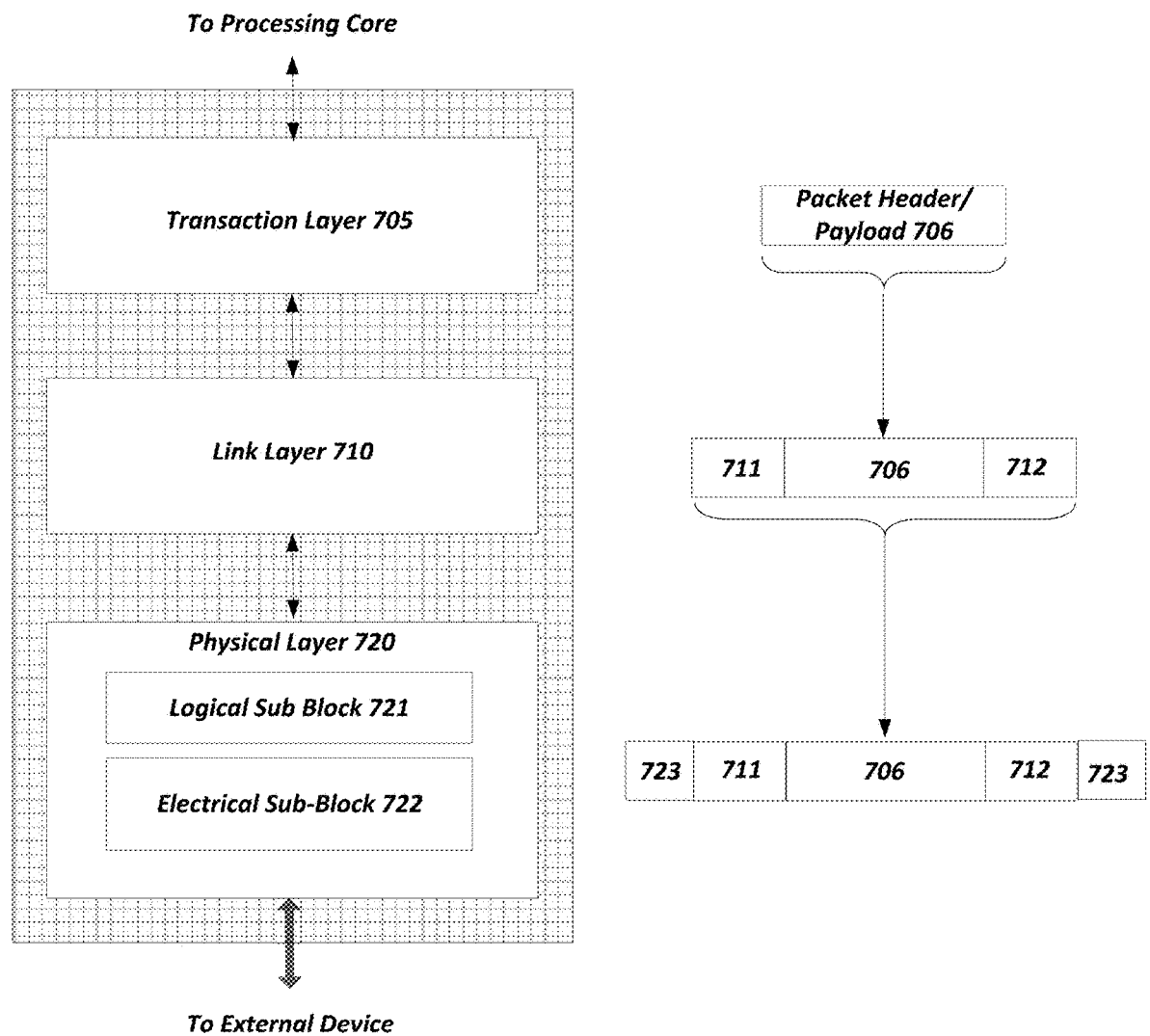
FIG. 7 illustrates an embodiment of an interconnect architecture including a layered stack.

Turning to FIG. 7 an embodiment of a layered protocol stack is illustrated. Layered protocol stack 700 includes any form of a layered communication stack, such as a Quick Path Interconnect (QPI) stack, a PCIe stack, a next generation high performance computing interconnect stack, or other layered stack. Although the discussion immediately below in reference to FIGS. 6-9 are in relation to a PCIe stack, the same concepts may be applied to other interconnect stacks. In one embodiment, protocol stack 700 is a PCIe protocol stack including transaction layer 705, link layer 710, and physical layer 720. An interface, such as interfaces 617, 618, 621, 622, 626, and 631 in FIG. 1, may be represented as communication protocol stack 700. Representation as a communication protocol stack may also be referred to as a module or interface implementing/including a protocol stack.

PCI Express uses packets to communicate information between components. Packets are formed in the Transaction Layer 705 and Data Link Layer 710 to carry the information from the transmitting component to the receiving component. As the transmitted packets flow through the other layers, they are extended with additional information necessary to handle packets at those layers. At the receiving side the reverse process occurs, and packets get transformed from their Physical Layer 720 representation to the Data Link Layer 710 representation and finally (for Transaction Layer Packets) to the form that can be processed by the Transaction Layer 705 of the receiving device.

Transaction Layer

In one embodiment, transaction layer 705 is to provide an interface between a device's processing core and the interconnect architecture, such as data link layer 710 and physical layer 720. In this regard, a primary responsibility of the transaction layer 705 is the assembly and disassembly of packets (i.e., transaction layer packets, or TLPs). The translation layer 705 typically manages credit-base flow control for TLPs. PCIe implements split transactions, i.e. transactions with request and response separated by time, allowing a link to carry other traffic while the target device gathers data for the response.

In addition, PCIe utilizes credit-based flow control. In this scheme, a device advertises an initial amount of credit for each of the receive buffers in Transaction Layer 705. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 705 assembles packet header/payload 706. Format for current packet headers/payloads may be found in the PCIe specification at the PCIe specification website.

Figure 8:
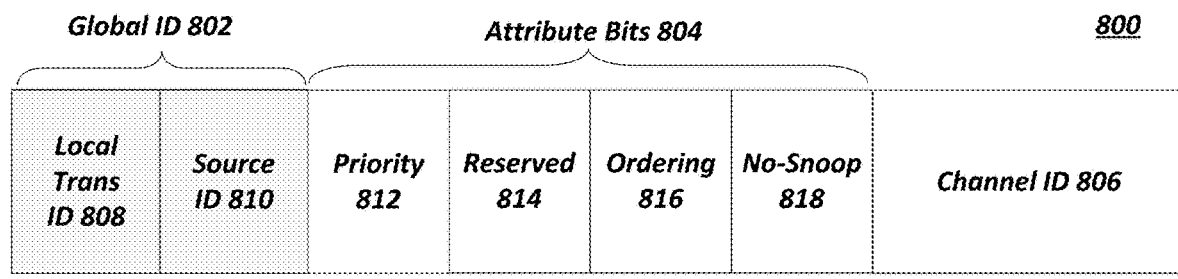
FIG. 8 illustrates an embodiment of a request or packet to be generated or received within an interconnect architecture.

Quickly referring to FIG. 8, an embodiment of a PCIe transaction descriptor is illustrated. In one embodiment, transaction descriptor 800 is a mechanism for carrying transaction information. In this regard, transaction descriptor 800 supports identification of transactions in a system. Other potential uses include tracking modifications of default transaction ordering and association of transaction with channels.

Transaction descriptor 800 includes global identifier field 802, attributes field 804, and channel identifier field 806. In the illustrated example, global identifier field 802 is depicted comprising local transaction identifier field 808 and source identifier field 810. In one embodiment, global transaction identifier 802 is unique for all outstanding requests.

According to one implementation, local transaction identifier field 808 is a field generated by a requesting agent, and it is unique for all outstanding requests that require a completion for that requesting agent. Furthermore, in this example, source identifier 810 uniquely identifies the requestor agent within a PCIe hierarchy. Accordingly, together with source ID 810, local transaction identifier 808 field provides global identification of a transaction within a hierarchy domain.

Attributes field 804 specifies characteristics and relationships of the transaction. In this regard, attributes field 804 is potentially used to provide additional information that allows modification of the default handling of transactions. In one embodiment, attributes field 804 includes priority field 812, reserved field 814, ordering field 816, and no-snoop field 818. Here, priority sub-field 812 may be modified by an initiator to assign a priority to the transaction. Reserved attribute field 814 is left reserved for future, or vendor-defined usage. Possible usage models using priority or security attributes may be implemented using the reserved attribute field.

In this example, ordering attribute field 816 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 818 is utilized to determine if transactions are snooped. As shown, channel ID Field 806 identifies a channel that a transaction is associated with.

Link Layer

Link layer 710, also referred to as data link layer 710, acts as an intermediate stage between transaction layer 705 and the physical layer 720. In one embodiment, a responsibility of the data link layer 710 is providing a reliable mechanism for exchanging Transaction Layer Packets (TLPs) between two components a link. One side of the Data Link Layer 710 accepts TLPs assembled by the Transaction Layer 705, applies packet sequence identifier 711, i.e. an identification number or packet number, calculates and applies an error detection code, i.e. CRC 712, and submits the modified TLPs to the Physical Layer 720 for transmission across a physical to an external device.

Physical Layer

In one embodiment, physical layer 720 includes logical sub block 721 and electrical sub-block 722 to physically transmit a packet to an external device. Here, logical sub-block 721 is responsible for the "digital" functions of Physical Layer 721. In this regard, the logical sub-block includes a transmit section to prepare outgoing information for transmission by physical sub-block 722, and a receiver section to identify and prepare received information before passing it to the Link Layer 710.

Physical block 722 includes a transmitter and a receiver. The transmitter is supplied by logical sub-block 721 with symbols, which the transmitter serializes and transmits onto to an external device. The receiver is supplied with serialized symbols from an external device and transforms the received signals into a bit-stream. The bit-stream is de-serialized and supplied to logical sub-block 721. In one embodiment, an 8 b/10 b transmission code is employed, where ten-bit symbols are transmitted/received. Here, special symbols are used to frame a packet with frames 723. In addition, in one example, the receiver also provides a symbol clock recovered from the incoming serial stream.

As stated above, although transaction layer 705, link layer 710, and physical layer 720 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 9:
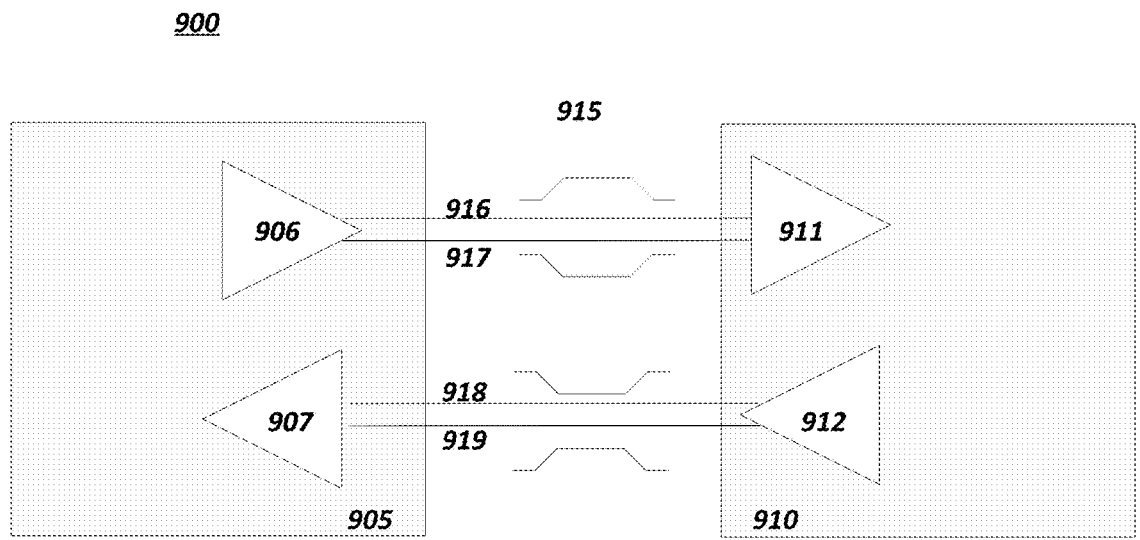
FIG. 9 illustrates an embodiment of a transmitter and receiver pair for an interconnect architecture.

Referring next to FIG. 9, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 906/911 and a receive pair 912/907. Accordingly, device 905 includes transmission logic 906 to transmit data to device 910 and receiving logic 907 to receive data from device 910. In other words, two transmitting paths, i.e. paths 916 and 917, and two receiving paths, i.e. paths 918 and 919, are included in a PCIe link.

A transmission path refers to any path for transmitting data, such as a transmission line, a copper line, an optical line, a wireless communication channel, an infrared communication link, or other communication path. A connection between two devices, such as device 905 and device 910, is referred to as a link, such as link 915. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 916 and 917, to transmit differential signals. As an example, when line 916 toggles from a low voltage level to a high voltage level, i.e. a rising edge, line 917 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Note that the apparatus, methods, and systems described above may be implemented in any electronic device or system as aforementioned. As specific illustrations, the figures below provide exemplary systems for utilizing the disclosure as described herein. As the systems below are described in more detail, a number of different interconnects are disclosed, described, and revisited from the discussion above. And as is readily apparent, the advances described above may be applied to any of those interconnects, fabrics, or architectures.

Figure 10:
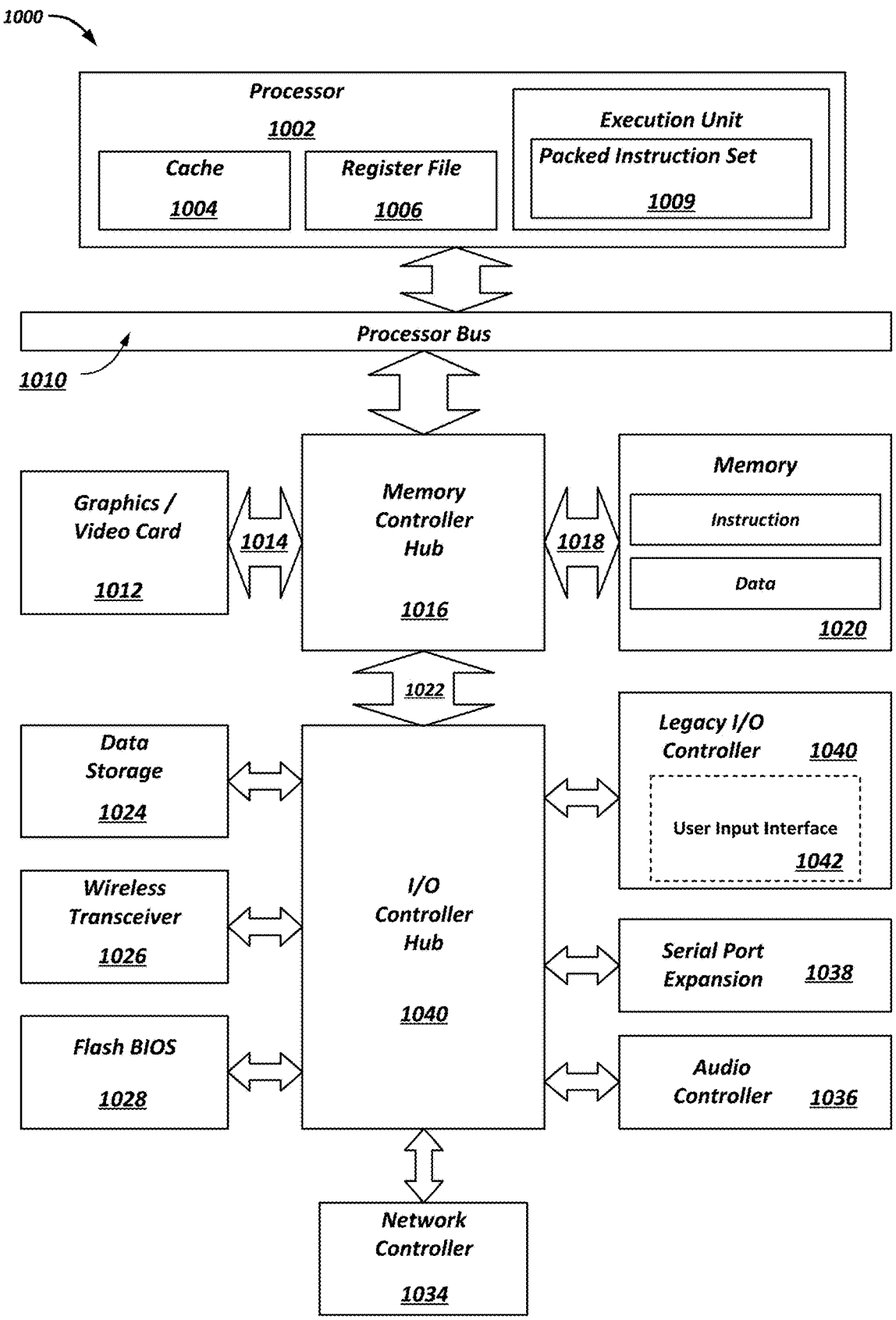
FIG. 10 illustrates another embodiment of a block diagram for a computing system including a processor.

Turning to FIG. 10, a block diagram of an exemplary computer system formed with a processor that includes execution units to execute an instruction, where one or more of the interconnects implement one or more features in accordance with one embodiment of the present disclosure is illustrated. System 1000 includes a component, such as a processor 1002 to employ execution units including logic to perform algorithms for process data, in accordance with the present disclosure, such as in the embodiment described herein. System 1000 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1000 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1002 includes one or more execution units 1008 to implement an algorithm that is to perform at least one instruction. One embodiment may be described in the context of a single processor desktop or server system, but alternative embodiments may be included in a multiprocessor system. System 1000 is an example of a 'hub' system architecture. The computer system 1000 includes a processor 1002 to process data signals. The processor 1002, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1002 is coupled to a processor bus 1010 that transmits data signals between the processor 1002 and other components in the system 1000. The elements of system 1000 (e.g. graphics accelerator 1012, memory controller hub 1016, memory 1020, I/O controller hub 1024, wireless transceiver 1026, Flash BIOS 1028, Network controller 1034, Audio controller 1036, Serial expansion port 1038, I/O controller 1040, etc.) perform their conventional functions that are well known to those familiar with the art.

In one embodiment, the processor 1002 includes a Level 1 (L1) internal cache memory 1004. Depending on the architecture, the processor 1002 may have a single internal cache or multiple levels of internal caches. Other embodiments include a combination of both internal and external caches depending on the particular implementation and needs. Register file 1006 is to store different types of data in various registers including integer registers, floating point registers, vector registers, banked registers, shadow registers, checkpoint registers, status registers, and instruction pointer register.

Execution unit 1008, including logic to perform integer and floating point operations, also resides in the processor 1002. The processor 1002, in one embodiment, includes a microcode (🗆 code) ROM to store microcode, which when executed, is to perform algorithms for certain macroinstructions or handle complex scenarios. Here, microcode is potentially updateable to handle logic bugs/fixes for processor 1002. For one embodiment, execution unit 1008 includes logic to handle a packed instruction set 1009. By including the packed instruction set 1009 in the instruction set of a general-purpose processor 1002, along with associated circuitry to execute the instructions, the operations used by many multimedia applications may be performed using packed data in a general-purpose processor 1002. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1008 may also be used in micro controllers, embedded processors, graphics devices, DSPs, and other types of logic circuits. System 1000 includes a memory 1020. Memory 1020 includes a dynamic random access memory (DRAM) device, a static random access memory (SRAM) device, flash memory device, or other memory device. Memory 1020 stores instructions and/or data represented by data signals that are to be executed by the processor 1002.

Note that any of the aforementioned features or aspects of the disclosure may be utilized on one or more interconnect illustrated in FIG. 10. For example, an on-die interconnect (ODI), which is not shown, for coupling internal units of processor 1002 implements one or more aspects of the disclosure described above. Or the disclosure is associated with a processor bus 1010 (e.g. Intel Quick Path Interconnect (QPI) or other known high performance computing interconnect), a high bandwidth memory path 1018 to memory 1020, a point-to-point link to graphics accelerator 1012 (e.g. a Peripheral Component Interconnect express (PCIe) compliant fabric), a controller hub interconnect 1022, an I/O or other interconnect (e.g. USB, PCI, PCIe) for coupling the other illustrated components. Some examples of such components include the audio controller 1036, firmware hub (flash BIOS) 1028, wireless transceiver 1026, data storage 1024, legacy I/O controller 1010 containing user input and keyboard interfaces 1042, a serial expansion port 1038 such as Universal Serial Bus (USB), and a network controller 1034. The data storage device 1024 can comprise a hard disk drive, a floppy disk drive, a CD-ROM device, a flash memory device, or other mass storage device.

Figure 11:
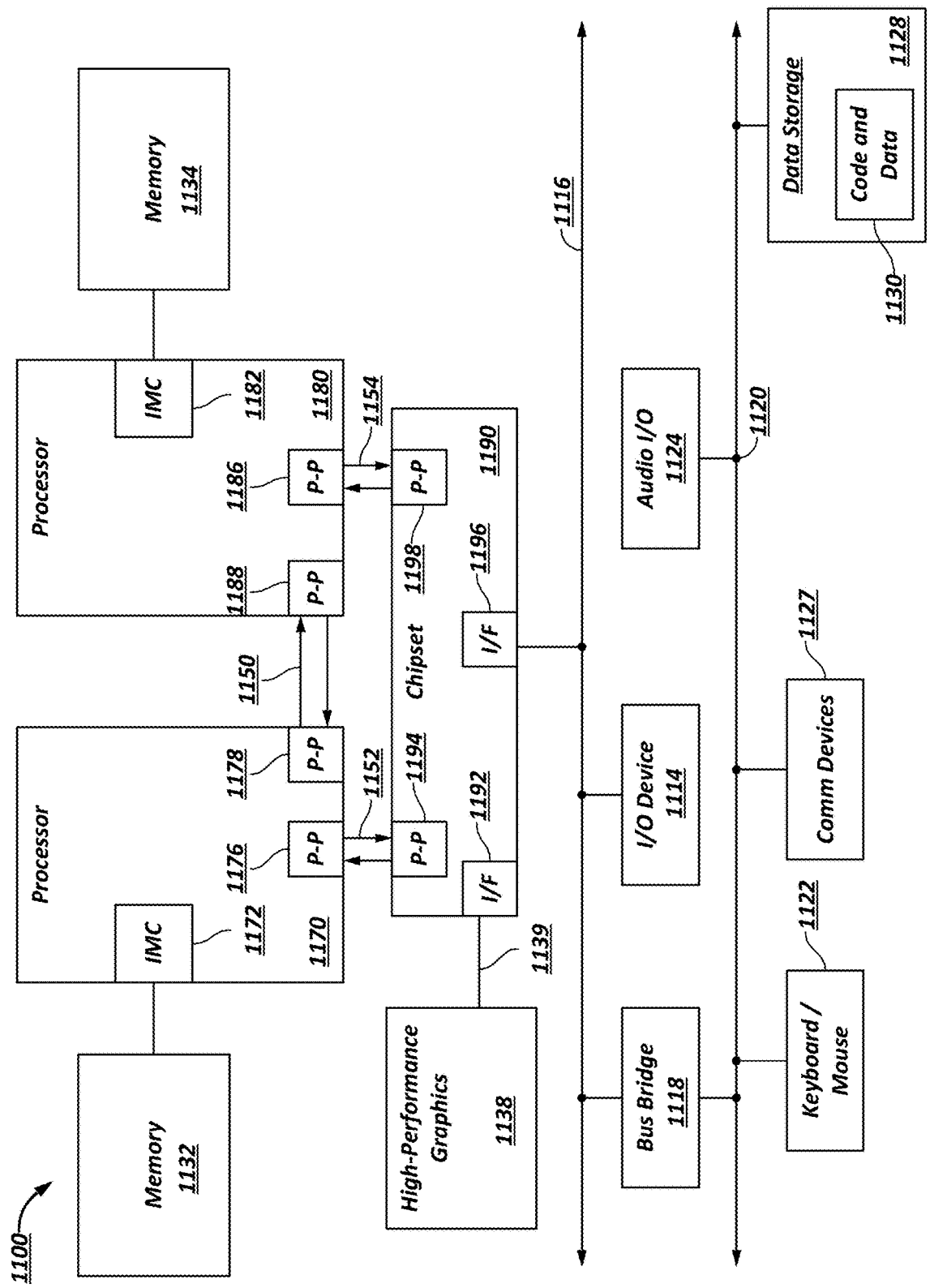
FIG. 11 illustrates an embodiment of a block for a computing system including multiple processor sockets.

Referring now to FIG. 11, shown is a block diagram of a second system 1100 in accordance with an embodiment of the present disclosure. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of a processor. In one embodiment, 1152 and 1154 are part of a serial, point-to-point coherent interconnect fabric, such as Intel's Quick Path Interconnect (QPI) architecture. As a result, the disclosure may be implemented within the QPI architecture.

While shown with only two processors 1170, 1180, it is to be understood that the scope of the present disclosure is not so limited. In other embodiments, one or more additional processors may be present in a given processor.

Processors 1170 and 1180 are shown including integrated memory controller units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 each exchange information with a chipset 1190 via individual P-P interfaces 1152, 1154 using point to point interface circuits 1176, 1194, 1186, 1198. Chipset 1190 also exchanges information with a high-performance graphics circuit 1138 via an interface circuit 1192 along a high-performance graphics interconnect 1139.

A shared cache (not shown) may be included in either processor or outside of both processors; yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 are coupled to first bus 1116, along with a bus bridge 1118 which couples first bus 1116 to a second bus 1120. In one embodiment, second bus 1120 includes a low pin count (LPC) bus. Various devices are coupled to second bus 1120 including, for example, a keyboard and/or mouse 1122, communication devices 1127 and a storage unit 1128 such as a disk drive or other mass storage device which often includes instructions/code and data 1130, in one embodiment. Further, an audio I/O 1124 is shown coupled to second bus 1120. Note that other architectures are possible, where the included components and interconnect architectures vary. For example, instead of the point-to-point architecture of FIG. 11, a system may implement a multi-drop bus or other such architecture.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

While this disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase "to" or "configured to," in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Various aspects and combinations of the embodiments are described above, some of which are represented by the following examples:

Example 1 is an apparatus comprising a port; and a multilane link coupled to the port, the multilane link operating at a first link width; the port comprising hardware circuitry to determine that the port is to operate using a second link width, the second link width less than the first link width; transmit an indication of a last data block for the first link width across one or more lanes of the multilane link; cause a first set lanes to enter an idle state; and transmit data on a second set of lanes, the second set of lanes defining the second link width.

Example 2 may include the subject matter of example 1, the port to, prior to transmitting the indication of a last data block for a first link width transmit across one or more of the first number of lanes a request to transition to the second link width; and receive from a link partner across one or more lanes of the multilane link an acknowledgment to transition to the second link width.

Example 3 may include the subject matter of any of examples 1-2, wherein the indication of the last data block is provided in a last double word of a data block using the first link width.

Example 4 may include the subject matter of example 3, wherein the last double word comprises an indication of the second link width.

Example 5 may include the subject matter of any of examples 1-4, the port to transmit an electric idle indication on the first set of lanes; and transmit an ordered set on the second set of lanes.

Example 6 may include the subject matter of any of examples 1-5, wherein the port is a downstream port, the port to receive, from an upstream port across the multilane link, a request to transition from the first link width to a third link width, the third link width less than the first link width and different from the second link width; ignore the request; and cause the link to transition to the second link width upon receiving an acknowledgment from the upstream port that the upstream port can transition to the second link width.

Example 7 may include the subject matter of any of examples 1-6, the port to transmit an indication to a link partner to activate a third set of lanes; perform link training on the third set of lanes while transmitting data on the second set of lanes; transmit an end data stream on the second set of lanes; and transmit data on the second and third set of lanes.

Example 8 may include the subject matter of example 7, the port to transmit and receive first training sequence ordered sets (TS1 OS) to link train the third set of lanes; and transmit and receive second training sequence ordered sets (TS2 OS) that indicate that link training is complete on the third set of lanes.

Example 9 may include the subject matter of example 8, the port to perform lane deskew on the third set of lanes; and transmit start data stream on transmission lanes that include lanes from the second and third sets of lanes.

Example 10 is a method performed by a port coupled to a multilane link, the multilane link comprising a first link width, the method comprising determining that a port of a multilane link is to operate using a second link width, the second link width less than the first link width; transmitting an indication of a last data block for the first link width across one or more lanes of the multilane link; causing a first set lanes to enter an idle state; and transmitting data on a second set of lanes, the second set of lanes defining the second link width.

Example 11 may include the subject matter of example 10, comprising, prior to transmitting the indication of a last data block for a first link width transmitting across one or more of the first number of lanes a request to transition to the second link width; and receiving from a link partner across one or more lanes of the multilane link an acknowledgment to transition to the second link width.

Example 12 may include the subject matter of any of examples 10-11, wherein the indication of the last data block is provided in a last double word of a data block using the first link width.

Example 13 may include the subject matter of example 12, wherein the last double word comprises an indication of the second link width.

Example 14 may include the subject matter of any of examples 10-13, further comprising transmitting an electric idle indication on the first set of lanes; and transmitting an ordered set on the second set of lanes.

Example 15 may include the subject matter of any of examples 10-14, wherein the port is a downstream port, the method comprising receiving, from an upstream port across the multilane link, a request to transition from the first link width to a third link width, the third link width less than the first link width and different from the second link width; ignoring the request; and causing the link to transition to the second link width upon receiving an acknowledgment from the upstream port that the upstream port can transition to the second link width.

Example 16 may include the subject matter of any of examples 10-15, further comprising transmitting an indication to a link partner to activate a third set of lanes; performing link training on the third set of lanes while transmitting data on the second set of lanes; transmitting an end data stream on the second set of lanes; and transmitting data on the second and third set of lanes.

Example 17 may include the subject matter of example 16, further comprising transmitting and receive first training sequence ordered sets (TS1 OS) to link train the third set of lanes; and transmitting and receive second training sequence ordered sets (TS2 OS) that indicate that link training is complete on the third set of lanes.

Example 18 may include the subject matter of example 17, further comprising performing lane deskew on the third set of lanes; and transmitting start data stream on transmission lanes that include lanes from the second and third sets of lanes.

Example 19 is a non-transitory computer-readable medium having program instructions stored therein, wherein the program instructions are executable by a computer system to perform operations comprising determining that the port is to operate using a second link width, the second link width less than the first link width; transmitting an indication of a last data block for the first link width across one or more lanes of the multilane link; causing a first set lanes to enter an idle state; and transmitting data on a second set of lanes, the second set of lanes defining the second link width.

Example 20 may include the subject matter of example 19, the operations further comprising, prior to transmitting the indication of a last data block for a first link width, transmitting across one or more of the first number of lanes a request to transition to the second link width; and receiving from a link partner across one or more lanes of the multilane link an acknowledgment to transition to the second link width.

Example 21 may include the subject matter of any of examples 19-20, wherein the indication of the last data block is provided in a last double word of a data block using the first link width.

Example 22 may include the subject matter of example 21, wherein the last double word comprises an indication of the second link width.

Example 23 may include the subject matter of any of examples 19-22, the operations further comprising transmitting an electric idle indication on the first set of lanes; and transmitting an ordered set on the second set of lanes.

Example 24 may include the subject matter of any of examples 19-23, the operations further comprising transmitting an indication to a link partner to activate a third set of lanes; performing link training on the third set of lanes while transmitting data on the second set of lanes; transmitting an end data stream on the second set of lanes; and transmitting data on the second and third set of lanes.

Example 25 may include the subject matter of example 24, the operations further comprising transmitting and receive first training sequence ordered sets (TS1 OS) to link train the third set of lanes; and transmitting and receive second training sequence ordered sets (TS2 OS) that indicate that link training is complete on the third set of lanes.

Example 26 is a system comprising an upstream port; a downstream port; and a multilane link connecting the upstream port to the downstream port, the multilane link comprising a first link width. The downstream port is to determine that the downstream port is to operate using a second link width, the second link width less than the first link width; transmit to the upstream port an indication of a last data block for the first link width across one or more lanes of the multilane link; cause a first set lanes to enter an idle state; and transmit data on a second set of lanes, the second set of lanes defining the second link width.

Example 27 may include the subject matter of example 26, the downstream port to, prior to transmitting the indication of a last data block for a first link width, transmit across one or more of the first number of lanes a request to transition to the second link width; receive from the upstream port across one or more lanes of the multilane link an acknowledgment (ACK) to transition to the second link width.

Example 28 may include the subject matter of any of examples 26, wherein the indication of the last data block is provided in a last double word of a data block using the first link width.

Example 29 may include the subject matter of example 28, wherein the last double word comprises an indication of the second link width.

Example 30 may include the subject matter of any of examples 26-29, the port to transmit an electric idle indication on the first set of lanes; and transmit an ordered set on the second set of lanes.

Example 31 may include the subject matter of any of examples 26,-30 the downstream port to receive, from the upstream port across the multilane link, a request to transition from the first link width to a third link width, the third link width less than the first link width and different from the second link width; ignore the request; and cause the link to transition to the second link width upon receiving an acknowledgment from the upstream port that the upstream port can transition to the second link width.

Example 32 may include the subject matter of any of examples 26-31, the downstream port to transmit an indication to a link partner to activate a third set of lanes; perform link training on the third set of lanes while transmitting data on the second set of lanes; transmit an end data stream on the second set of lanes; and transmit data on the second and third set of lanes.

Example 33 may include the subject matter of example 32, the downstream port to transmit and receive first training sequence ordered sets (TS1 OS) to link train the third set of lanes; and transmit and receive second training sequence ordered sets (TS2 OS) that indicate that link training is complete on the third set of lanes.

Example 34 may include the subject matter of example 33, the downstream port to perform lane deskew on the third set of lanes; and transmit start data stream on transmission lanes that include lanes from the second and third sets of lanes.

Example 35 is an apparatus that can include a means for determining that a port of a multilane link is to operate using a second link width, the second link width less than the first link width; means for transmitting an indication of a last data block for the first link width across one or more lanes of the multilane link; means for causing a first set lanes to enter an idle state; and means for transmitting data on a second set of lanes, the second set of lanes defining the second link width.

What is claimed is:

1. An apparatus comprising:
a port to couple to a device over a link, the link comprising a set of lanes, the set of lanes comprising a total number of lanes, a first number of lanes less than the total number of lanes, and a second number of lanes less than the total number of lanes; the port to:
transmit data on the link using each lane of the set of lanes;
receive a request to transmit data on the first number of lanes;
transmit an electrical idle ordered set (EIOS) on the second number of lanes during a SKP OS interval; and
transmit skip ordered sets (SKP OS) on the first number of lanes during the SKP OS interval; and
transmit data on the first number of lanes.

2. The apparatus of claim 1, the port to send an acknowledgment message across the link acknowledging the request to transmit data using the first number of lanes.

3. The apparatus of claim 1, wherein the first number of lanes is greater than the second number of lanes; the port to:
send a request across the link to transmit data using the second number of lanes; and
send an acknowledgment message across the link acknowledging the request to transmit data using the first number of lanes.

4. The apparatus of claim 1, the port to receive a request to transmit data on a third number of lanes, the third number lanes adding additional lanes to the first number of lanes.

5. The apparatus of claim 1, where the port is to:
receive a request to up-size link width from the first number of lanes to the total number of lanes;
transmit training set ordered sets on the second number of lanes in response to receipt of the request to up-size the link width and contemporaneously transmit data on the first number of lines;
transmit SKP OS on the total number of lanes after transmission of the training ordered sets; and
transmit data on the total number of lanes after the transmission of the SKP OS on the total number of lanes.

6. The apparatus of claim 4, the port to:
transmit data on the first number of lanes;
transmit an electrical idle exit ordered set (EIEOS) on the additional lanes;
transmit training sequences on the additional lanes; and
transmit data on the third number of lanes.

7. A method comprising:
transmitting data across a multilane link using an active link state (L0 state), the active link state using each lane of the multilane link,
the multilane link comprising a first subset of lanes and a second subset of lanes;
receiving a request to transmit data using a partial link width state (L0p state), the request indicating the first subset of lanes for transmission of data;
transmitting an electrical idle ordered set (EIOS) on the second subset of lanes during a skip ordered set (SKP OS) interval;
deactivating the second subset of lanes; and
transmitting data on the first subset of lanes.

8. The method of claim 7, further comprising sending an acknowledgment message acknowledging the request.

9. The method of claim 7, further comprising transmitting skip ordered sets (SKP OS) on the first subset of lanes during the SKP OS interval.

10. The method of claim 7, wherein the first subset of lanes is greater than the second subset of lanes, the method further comprising:
sending a request to transmit data using the L0p state, the request indicating the second subset of lanes for transmission of data; and
sending an acknowledgment message across the link acknowledging the request to transmit data using the first subset of lanes.

11. The method of claim 7, further comprising receiving a request to transmit data on a third subset of lanes, the third subset of lanes adding additional lanes to the first subset of lanes.

12. The method of claim 7, further comprising:
receiving a request to up-size link width from the first subset of lanes to the first and second subsets of lanes;
transmitting training set ordered sets on the second subset of lanes in response to receipt of the request to up-size the link width and contemporaneously transmitting data on the first subset of lines;
transmitting skip ordered sets (SKP OS) on the first and second subsets of lanes after transmission of the training ordered sets; and
transmitting data on the first and second subsets of lanes after the transmission of the SKP OS on the first and second subsets of lanes.

13. The method of claim 11, further comprising:
transmitting data on the first subset of lanes;
transmitting an electrical idle exit ordered set (EIEOS) on the additional lanes;
transmitting training sequences on the additional lanes; and
transmitting data on the third subset of lanes.

14. A system comprising:
a first component comprising a downstream port (DSP);
a second component comprising an upstream port (USP);

a multilane link interconnecting the DSP and the USP, the multilane link comprising a total number of lanes, the total number of lanes comprising a first number of lanes and a second number of lanes;

the DSP to:

transmit data on the link using each lane of the total number of lanes;

receive, from the USP, a request to reduce a number of active lanes from the total number of lanes to the first number of lanes;

during a skip ordered set (SKP OS) interval:
  send an electrical idle ordered set (EIOS) to the USP instead of a SKP OS on the second number of lanes, and
  send a SKP OS on the first number of lanes to the USP; and after the SKP OS interval, send data on the first number of lanes to the USP, the first number of lanes less than the total number of lanes.

15. The system of claim 14, the DSP to send an acknowledgment message acknowledging the request to the USP.

16. The system of claim 14, wherein the first number of lanes is greater than the second number of lanes;

the DSP to:
  send a request to the USP to transmit data using the second number of lanes; and
  send an acknowledgment message to the USP acknowledging the request to transmit data using the first number of lanes.

17. The system of claim 14, the DSP to:
send the EIOS to the USP on the second number of lanes during the SKP OS interval; and
send the SKP OS to the USP on the first number of lanes during a SKP OS interval.

18. The system of claim 14, the DSP to receive a request from the USP to transmit data on a third number of lanes, the third number of lanes adding additional lanes to the first number of lanes.

19. The system of claim 14, wherein the DSP is to transmit data using each lane of the total number of lanes during an active link state.

20. The system of claim 14, wherein the DSP is to transmit data using the first number of lanes during a partial link width state.

21. The system of claim 14, where the DSP is to:
receive a request to up-size link width from the first number of lanes to the total number of lanes;
transmit training set ordered sets on the second number of lanes in response to receipt of the request to up-size the link width and contemporaneously transmit data on the first number of lines;
transmit skip ordered sets on the total number of lanes after transmission of the training ordered sets; and
transmit data on the total number of lanes after the transmission of the skip ordered sets on the total number of lanes.

22. The system of claim 18, the DSP to:
transmit data to the USP on the first number of lanes;
transmit an electrical idle exit ordered set (EIEOS) to the USP on the additional lanes;
transmit training sequences to the USP on the additional lanes; and
transmit data to the USP on the third number of lanes.

* * * * *